Aug. 17, 1943.  S. CLAUSEN  2,327,020
CIGAR BUNCH SHAPER
Filed Jan. 23, 1940  2 Sheets—Sheet 2
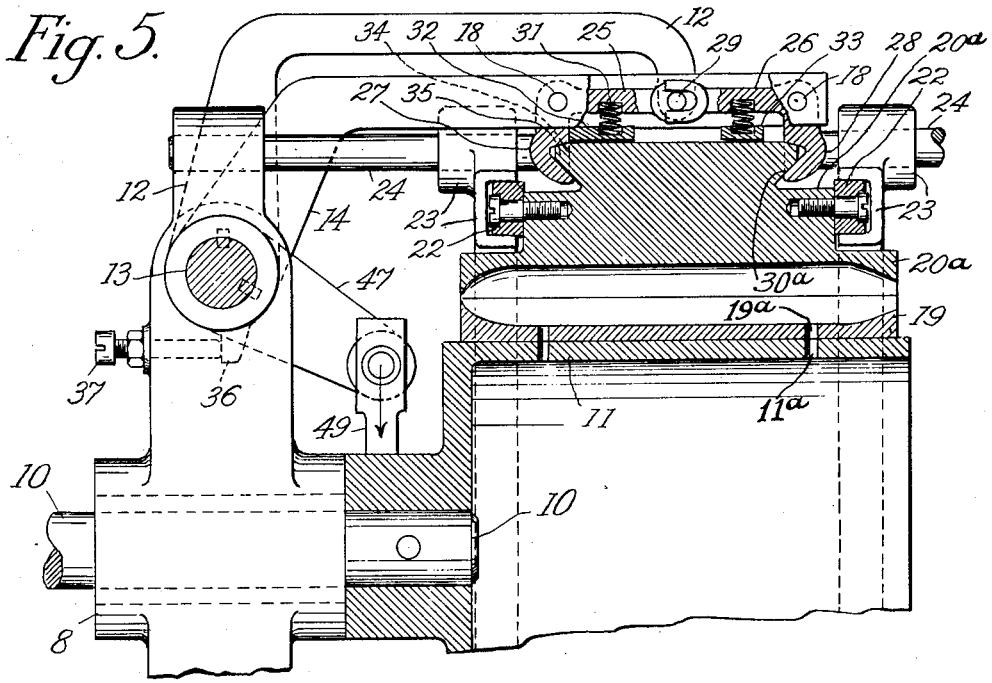
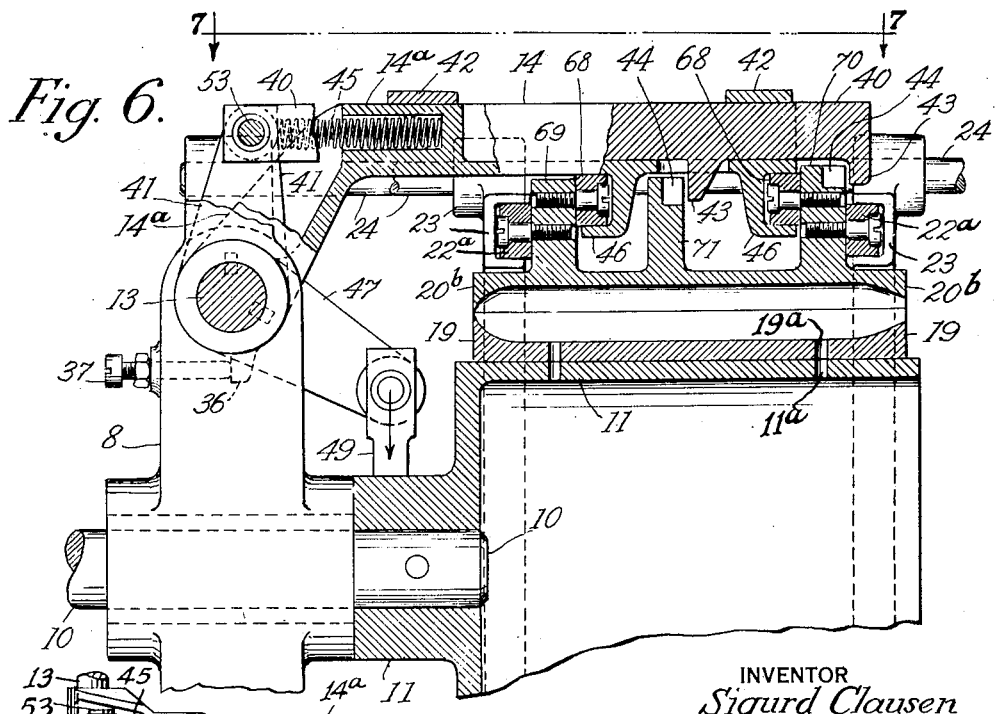
INVENTOR
Sigurd Clausen
BY Georges Hastings
ATTORNEY Patented Aug. 17, 1943

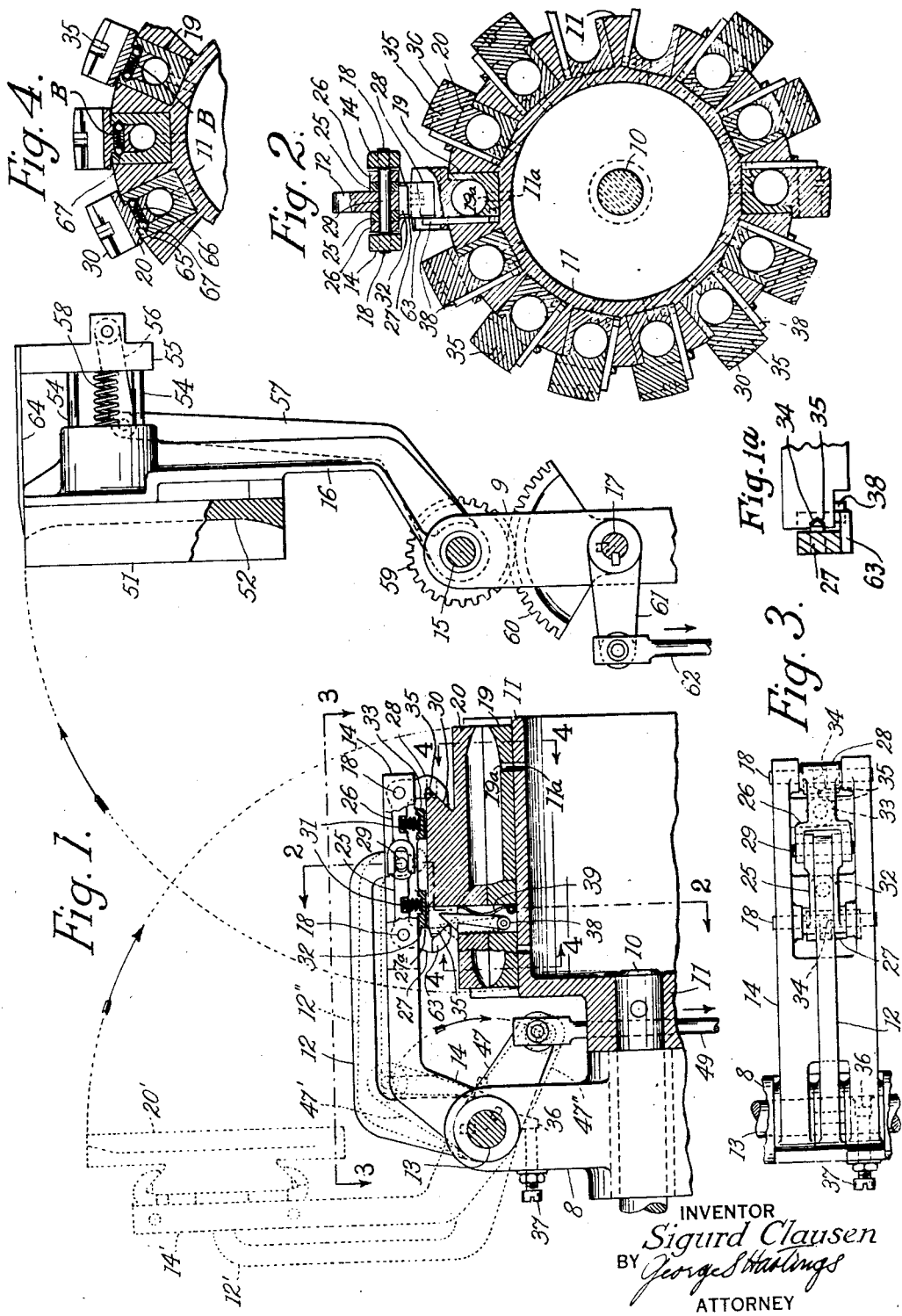

2,327,020

UNITED STATES PATENT OFFICE 2,327,020

CIGAR BUNCH SHAPER

Sigurd Clausen, Brooklyn, N. Y., assignor to International Cigar Machinery Company, a corporation of New Jersey Application January 23, 1940, Serial No. 315,137

34 Claims. (Cl. 131—87)

This invention relates to cigar machines and more particularly to improvements in cigar bunch shaping mechanism suitable for use chiefly in the formation of short filler cigar bunches. It has special reference to improvements in the construction of molds and covers therefor, and means employed in the efficent operation of the shaping mechanism.

This invention relates generally to a cigar machine of the turret type in which a plurality of pockets are mounted on or formed integrally with a turret, which turret is rotated step by step to present the pockets to cover removing and replacing and pocket filling mechanism in timed relation so that a continuous succession of bunches is always undergoing shaping.

According to the preferred form of my invention, the covers which cooperate with the mold pockets are of an improved type and each cover is adapted to be associated with its respective pocket as a complete unit, all of which adds to the general efficiency of the mechanism. In order to properly remove, replace and position covers in the pockets I have provided improved cover handling mechanism which carries out this purpose.

It is, therefore, an object of the invention to provide simplified mechanism for removing and replacing bunch shaping covers on a turret or other bunch shaping means wherein toggle mechanism is operative to lift and replace the covers upon the pockets from which they were removed.

The invention also consists in the provision of improved mechanism for locking and holding bunch molding covers in molding relationship with respect to bunches located in bunch shaping molds.

It is a further object of the invention to provide improved means for holding bunch shaping covers in shaping position with respect to a mold without requiring external cooperating mechanism for maintaining the covers in such position.

The invention also contemplates the provision of a toggle actuated device provided with jaws or receiving and holding elements which position bunch covers over pockets of a mold, and means for effecting the removal and replacement of covers in proper order.

A further object of the invention is the provision of improved means for aligning bunch covers in molding relationship with the pockets of a cigar bunch mold or molding turret.

The invention also consists of the provision of notches or grooves at the end of each bunch cover which coact with complementary means on the cover manipulating device in order to properly center the individual covers with respect to the pockets of the molding member on which they are placed.

An additional object is the provision of a mold shaping cover handling device provided with toggle jaws which grip a bunch mold cover for removal and replacement, which jaws are furnished with means coacting with grooves or notches on covers for aligning and locating them properly with respect to the mold pockets.

With these and other objects not specifically mentioned in view, the invention consists in certain combinations and constructions which will be hereinafter fully described, and then set forth in the claims hereunto appended.

In the accompanying drawings which form a part of this specification, and in which like characters of reference indicate the same or like parts:

Figure 1 is a side elevation, partly in section, showing the arrangement of the toggle levers and latches for manipulating the pocket covers of a cigar bunch shaping turret;

Figure 1a is a fragmentary plan view, partly in section, of Fig. 1, showing the gripper jaw slightly separated from the corresponding dovetail, to illustrate in detail the cover holding clamp engaging with the extension formed on the gripper jaw and also the tapered pins connected to the faces of the gripper jaws, fitting into the corresponding notch formed in the dovetails of the cover;

Figure 2 is a sectional end elevation on line 2—2 of Figure 1;

Figure 3 is a top view of the cover manipulating swing arm as seen from line 3—3 of Figure 1;

Figure 4 is a partial sectional end elevation on line 4—4 of Figure 1 showing another form of device for locking the covers in place on the turret pockets;

Figure 5 is a partial sectional side elevation showing a modified form of the invention which utilizes the combination of toggle levers and roller pathways;

Figure 6 is a partial side elevation illustrating another form of bunch shaping cover manipulating device;

Figure 7 is a partial top view of the cover removing mechanism, as seen from line 7—7 of Figure 6.

Referring to Figures 1 to 3, which show one modification of my invention, side plate 8 of the machine supports the shaft 10 of turret 11 which may be rotated intermittently by means of an indexing device which may be similar to that described and shown in United States Patent No. 1,838,157 granted to R. E. Rundell on December 29, 1931, for Cigar bunch concentrator. The side plate 9, suitably attached to the machine frame, supports a shaft 15, on which is loosely mounted the loading arm 16. Fixedly attached to the shaft 15 is a lever 57 which is connected to arm 16 by link 56, cross-head compression spring 58, and guide rods 54. Shaft 15 is rotated from pocket filling position through approximately 180° into discharge position and back again by means of gear 59 and gear segment 60. As shown in Figure 1, the rotation of shaft 15 is effected by means of a crank 61 attached to shaft 17, which mounts gear segment 60. A rod 62 pivoted to crank 61 rotates shaft 17 by means of a suitable cam (not shown). It will be seen, therefore, that arm 16 carries the loading pocket 51, the movable bottom 52, which then is pushed outward by the lever 57 at the end of its swing or at bunch discharge position after the pocket 51 has come to rest adjacent the turret pocket, thereby permitting relative motion between the lever 57 and arm 16. The relative motion which effects an ejection of a bunch which has been tightly placed into the pocket by the operator causing a knife 64 mounted on cross-head 65 to trim one end of the raw bunch in pocket 51 as the bunch is discharged into the molding turret pocket 19.

Bracket 8 carries a shaft 13, which is rocked by crank 47 operated by a suitable cam (not shown) through the medium of a rod 49 connected to crank 47. On shaft 13 is loosely mounted an arm 14 and fixedly attached thereto is a lever 12. The arm 14 in the illustrated embodiment is forked at both ends, with the lever 12 mounted between the two hub prongs. On pins 18, between its furcations, arm 14 carries a pair of toggle levers 25 and 26 provided with jaws 27 and 28, respectively, which are operated by means of a pin 29 in the outer end of lever 12. The pocket covers 20 are provided with dovetail extensions 30 and the jaws 27 and 28 are so arranged that normally when they coact with the pocket covers they are held in closed position against these dovetails by compression springs 31 carried in sockets 32, 33 depending from arm 14. Socket 32 also forms a stop for jaw 27 and limits its rotation about its support pin 18, thereby holding the covers in a definite axial position when the jaws are closed against the dovetails 30. In the structure shown, the gripping faces of jaws 27 and 28 are provided with tapered pins 34 (Figure 3) which are adapted to seat themselves in V-grooves or notches 35 formed in dovetails 30 (Figures 1 and 3) and in this way provide positive means for aligning the covers circumferentially with the pockets 19. If desired, complementary projections may be formed integral with jaws 27 and 28 for cooperation with dovetails 30 in the covers 20 on the pockets. In order to locate each cover axially with respect to its respective pocket, projection 27a on toggle jaw 27, engages the seat of spring 31 (left, as shown in Figure 1) which limits the inward movement of toggle jaw 27. A lost motion between the pin 29 and slot connection of the toggle jaws makes this possible.

In the closed position of the jaws 27 and 28, the lever 12, arm 14 and pocket cover 20 are locked together in one unit. When this unit has been turned from its vertical position 12', 14', 20' (shown in dotted lines in Figure 1) to its cover replacing position (shown in full lines) by the movement of crank 47 from its dotted position 47', a lug 36 on the hub of arm 14 comes to rest against an adjusting screw 37 on bracket 8, so that a further motion of crank 47 to a position 47'', causes lever 12 to move relative to arm 14 into position 12'' thereby compressing the springs 31 of jaws 27, 28 of the toggle levers. When the jaws have been opened in this manner, the turret is indexed one step by any suitable conventional indexing device, such as shown in the Rundell patent, above mentioned, and the same series of operations in removing and replacing the next cover takes place.

In the preferred form of my invention, each of the pockets 19 carried by turret 11 is provided with a spring pressed latch 38, which is moved axially relative to the mold pocket into cover locking engagement with the top surface of each of the covers 20 by means of spring 39, as shown in dotted lines in Figure 1, thereby holding the cover firmly in place as the turret revolves. The latches hold the covers firmly secured to the turret from the time a cover is placed in clamping position with respect to a bunch located in a pocket until it is again presented for unloading. In order to release a latch 38 at the unloading position, means carried by the cover manipulating arm may be used. Each of the mold pockets 19, which carries the cover latching mechanism, is removably mounted on turret 10 and hence the molds can be replaced if worn or broken, or molds of different size and shape can be substituted. In the form shown in Figures 1 and 2, gripper jaw 27 is provided with a radial extension 63 arranged to engage with the inclined top surface of the latches 38, thereby causing the latter by a camming action, to disengage the covers for their subsequent removal and replacement.

Another satisfactory device for clamping covers 20 on the pockets 19 for travel with the turret 11 during the bunch shaping operation consists of the provision of bores B at each end of the covers 20, as shown in Figure 4. Small balls 65, inserted in the bores, are pressed outwardly by springs 66 into notches 67 formed in the side walls of the pockets and lock the covers resiliently in position on the pockets 19.

After insertion of the balls the ends of the bores in the covers are peened just enough to allow the balls to protrude a sufficient distance, but to prevent them from falling out when the cover is disengaged. The up-motion of the arm 14 in removing the cover will pull the balls 65 out of engagement with grooves 67, and its down-motion in replacing the covers will push the balls back into place in the grooves and the pressure of the spring 66 will hold the covers tight during the rotation of the turret.

In the modification shown in Figure 5, the new toggle arrangement is combined with roller pathways similar in construction to those shown in the Rundell patent. Shaft 13, which is intermittently rocked by the crank 47 by means of rod 49, carries cooperating lever 12 and arm 14, the latter being provided with furcations in which are mounted pins 18 supporting the toggle levers 25 and 26 having the gripper jaws 27, 28 operated by the pin 29 in lever 12. Compression springs 31, supported in sockets 32 and 33, hold the gripper projections 34 in grooves 35 of the dovetail extensions 30a of the covers 20a until the stop lug 36 of the arm 14 contacts the screw 37, whereupon relative motion between arm 14 and lever 12 takes place and the grippers open to release the cover. Covers 20a are equipped at each end with rollers 22 which maintain them in position on their respective pockets. These rollers upon the next forward step of the turret 11 on shaft 10 enter into the annular pathways 23 depending from shafts 24 supported by side frames 8 and 9 of the machine. The pathways 23 encircle all but the top portion of the turret 11, the gap being just wide enough to lift the cover off the top pocket. Aligned holes 11a and 19a are provided for coacting bunch removing rods, which may be of the same type as shown in the above referred to Rundell patent.

In the modification shown in Figure 6, the loose cover arm 14a is substantially of channel shaped cross-section and carries a slide bar 40 attached by pin 53 to lever 41 affixed to shaft 13 which receives rocking motion from crank 47. The construction of arm 14a and bar 40 is similar to that shown in the patent to Rundell No. 1,838,157. The arm 14a has transverse pathways 46 into which enter a pair of rollers 68 carried by lugs 69 and 70 of the pocket covers 20b as the turret 11 on shaft 10 completes one complete revolution of the corresponding pocket 19. The slide bar 40 is guided by the strips 42 attached across the top of arm 14a, and has downwardly projecting fingers 43 adapted to engage with slots 44 in lugs 70 and 71 of the cover 20b. The slide bar 40 is kept in its engaged position by compression springs 45 interposed between lever 41 and arm 14a. When the lug 36 of arm 14a comes to rest against stop screw 37, in the loading position of pocket 19, the further motion of crank 47 compresses the springs 45 and moves the bar 40 farther into arm 14a, causing the fingers 43 to disengage from the slots 44. As the turret 11 then advances another step, the rollers 68 leave the pathways 46 of arm 14a, and the rollers 22a carried by the cover lugs 69 and 70 enter the annular pathways 23 affixed to shafts 24, thus holding the cover of the freshly filled pocket in place for one revolution of the turret.

The invention above described may be varied in construction within the scope of the claims, for the particular device, selected to illustrate the invention, is but one of many possible concrete embodiments of the same. It is not, therefore, to be restricted to the precise details of the structure shown and described.

What is claimed is:

1. The combination with a group of complementary pocket and completely detachable cover members for shaping bunches, of means mounted on said pockets for securing said covers in shaping position relative to said pockets, means movable into position to engage and completely detach said covers from said pockets, and a device carried by said last named means for releasing said covers for removal from said pockets.

2. The combination with a cigar bunch shaping pocket, and a cover arranged to cooperate therewith in shaping bunches placed in said pocket, of projections mounted on said cover, mechanism having jaws movable toward and away from each other for gripping said projections for removing and replacing said cover on said pocket, and means on said mechanism arranged to locate said cover axially with respect to said pocket.

3. The combination with a cigar bunch shaping pocket, and a completely detachable cover arranged to cooperate therewith in shaping bunches placed in said pocket, of projections mounted on said cover, means mounted on said pocket for detachably securing said cover in shaping position thereon, mechanism for gripping said projections for removing and replacing said cover on said pocket, and means on said mechanism arranged to locate said cover axially with respect to said pocket.

4. The combination with cigar bunch shaping pockets, a revolving turret support for said pockets, and complementary shaping covers wholly removable from said shaping pockets and revolving turret support, of projections formed on said covers, means engaging with said projections for holding said covers on said pockets, cover removing means formed on said covers, and additional mechanism engaging with said cover removing means for lifting said covers from said pockets to permit the removal and insertion of cigar bunches.

5. The combination with a cigar bunch shaping pocket, and a complementary shaping cover arranged to coact therewith in shaping bunches located in said pocket, of cover lifting elements formed on said cover, spaced toggle actuated members located to receive said cover and engage said elements, an arm mounting said members, means for moving said arm to and from said pocket to remove and replace said cover, and means to release said cover from said members when said cover has been replaced on said pocket.

6. The combination with a cigar bunch shaping pocket, and a complementary shaping cover arranged to coact therewith in shaping bunches located in said pocket, of cover lifting elements formed on said cover, spaced toggle actuated members located to receive said cover and engage said elements, an arm mounting said members, means for moving said arm to and from said pocket to remove and replace said cover, means to release said cover from said members when said cover has been replaced on said pocket, including a second arm, and means for moving said second arm relative to said first-named arm.

7. The combination with a row of cigar bunch shaping pockets, and completely detachable complementary shaping covers therefor, of latch mechanism carried by said pockets for engaging and detachably holding said covers in shaping position on said pockets, a device for removing and replacing said covers for loading and unloading said pockets, and means carried by said device for unlatching said mechanism to free said covers for removal.

8. In a cigar shaping mechanism, the combination with a turret provided with a plurality of pockets and covers coacting with said pockets for molding bunches in said pockets, of a device for removing and replacing said covers on said pockets, said device comprising an arm, a pair of cover engaging jaws mounted on said arm, a toggle connection between said jaws, and means movable relative to said arm for opening said jaws to release a cover held thereby.

9. In a cigar machine, a transfer arm for removing and replacing covers on pockets of a shaping turret, said arm comprising, spaced supporting members, jaws carried by said supports, springs normally urging said jaws together into cover gripping relation with respect to a cover, and means for opening said jaws.

10. A cigar machine transfer for removing and replacing covers on a shaping pocket, comprising a supporting arm provided with a bifurcated jaw supporting portion, spaced coacting jaws carried by said portion, and arranged to grip a cover, springs normally urging said jaws together into cover engaging position, and means for opening said jaws to release a cover held by said jaws.

11. A cigar machine cover transfer for removing and replacing covers on a bunch shaping pocket, comprising a bifurcated cover gripping jaw supporting member, jaws mounted in said member and arranged to engage and hold a cover to be removed and replaced on a pocket, a pin and slot connection between said jaws, springs normally urging said jaws into gripping position, and an arm cooperating with said member for opening said jaws.

12. A cigar machine cover transfer for removing and replacing covers on cigar bunch shaping pockets, comprising a support movable to and from said pockets, spaced cover holding members mounted on said support, means normally tending to move said members towards each other into cover holding position, and means carried by said members for aligning said covers on said pockets.

13. The combination with a cigar bunch shaping pocket, and a complementary bunch shaping cover coacting therewith to shape bunches located in said pocket, of latch means associated with said pocket and cover for holding said cover on said pocket, a transfer arm for removing and replacing a cover on said pocket comprising a movable supporting member, cover engaging jaws carried by said member, resilient means normally urging said jaws into holding engagement with respect to said cover, means for releasing said cover from said jaws, and means for moving said support towards said pocket to unlatch said cover from said pocket.

14. In a cigar machine, the combination with a bunch shaping pocket, and a shaping cover cooperating therewith for shaping bunches located in said pocket, of latch means for locking said cover to said pocket, a cover transfer arm for removing and replacing a cover on said pocket, and means carried by said arm and coacting with said latch means for releasing said cover for removal from said pocket.

15. In a cigar machine, the combination with a movable bunch shaping pocket, and a shaping cover associated therewith, latch means for locking said cover for movement with said pocket, a transfer movable to and from said pocket for removing and replacing said cover on said pocket, and means carried by said transfer for unlatching said cover from said pocket.

16. A cigar bunch shaping mechanism, comprising a mold pocket having an elongated generally concave cigar shaped portion, and indented portions formed in the sides of said pocket, a cover having an elongated generally concave cigar shaped concave portion complementary to that of said pocket, and latch means associated with said cover and coacting with said indented portions for securing said cover to said pocket.

17. A cigar bunch shaping mechanism, comprising a mold pocket having an elongated generally concave cigar shaped portion with indented portions formed in the side walls thereof, and a cover having a generally concave cigar shaped portion complementary to that of said pocket arranged to coact with said pocket in shaping bunches located therein, said cover being provided with bores, spring pressed balls positioned in said bores and arranged to engage said indented portions for securing said cover and pocket in shaping relationship, and means for securing said balls in said bores.

18. The combination with a series of complementary male and female bunch shaping pockets and covers, of means having a cooperating pathway on either side of said pockets for holding said covers on said pockets during shaping operations, cover handling projections mounted on the upper surface of said covers, yieldable gripping members relatively movable toward and away from each other arranged to grip said projections, and a device mounting said members for removing and replacing said covers on said pockets.

19. The combination with a rotary turret provided with a series of spaced mold pockets about its periphery, of a plurality of shaping covers associated with said pockets for shaping bunches located in said pockets, means having a cooperating pathway on either side of said series for holding said covers in shaping relationship with said pockets during the rotation of said turret from bunch loading position to bunch discharging position, and means located at said discharge position for removing said cover, said means comprising a transfer arm, jaws located to engage said cover, means for closing said jaws on said cover, and means for moving said arm to remove said cover.

20. The combination with an intermittently rotatable turret provided with a plurality of mold pockets about its periphery, of a plurality of complementary covers coacting with said pockets to shape bunches located therein, means having a cooperating pathway on either side of said pockets for holding said covers on said pockets by engaging the ends of said covers, cover removing members carried on said covers and spaced from the ends of said covers, a transfer cooperating with said turret for removing and replacing covers on said pockets, comprising a pair of jaws positioned to engage said members during the rotation of said turret, means for forcing said jaws into engagement with said members, means for effecting removal and replacement of said covers on said pockets, and means for releasing said covers from said jaws before rotation of said turret.

21. The combination with an intermittently rotating turret provided with a series of mold pockets spaced about its periphery, and a plurality of bunch shaping covers cooperating with said mold pockets for shaping bunches lodged therein, of means having a cooperating pathway on either side of said series for holding said covers on said pockets during rotation of said turret by engagement with the ends of said covers, cover removing means carried by said covers and spaced from the ends of said covers, a cover removing and replacing transfer, comprising a movable support, cover gripping means mounted on said support, and arranged to be moved into the path of covers on said pockets, means for gripping said covers including coacting gripper jaws, means for urging said jaws together into cover gripping position for removing said covers, and means for releasing said covers from said jaws upon replacement of said covers.

22. The combination with an intermittently rotatable turret provided with a plurality of spaced pockets around its periphery, of a plurality of complementary covers cooperating with said pockets for shaping bunches located therein, means having a cooperating pathway on either side of said pockets for holding said covers in operative positions on said pockets, a pair of jaws positioned to engage said covers at pocket unloading position, toggle mechanism operating said jaws to release a cover held therein, and springs for urging said jaws into cover gripping position.

23. The combination with a turret provided with a plurality of cigar bunch molding pockets, of a plurality of bunch shaping covers associated with said pockets, means forming a cooperating pathway on each side of said pockets for holding said covers positioned on said pockets, rollers mounted on said covers arranged to track in said pathways, cover removing rollers also carried by said covers, and a transfer located adjacent said turret at bunch unloading position provided with tracks located to receive said cover removing rollers for effecting the removal of said covers from said mold pockets by said transfer.

24. In a cigar machine having a rotatable turret provided with a plurality of spaced mold shaping pockets and removable covers associated one with each of said pockets, means movable into engagement with one of said covers, and pivoted members carried by said means for clamping said covers in said means for removal from said pockets.

25. In a cigar machine, the combination with a member provided with a bunch shaping pocket adapted to receive a bunch and shape the same therein, of a bunch shaping cover arranged to close said pocket, extensions formed on said cover, and a member provided with resiliently mounted toggle jaws movable into engagement with said extensions to grip said cover for removal from said pocket.

26. In a cigar machine, the combination with a member provided with a bunch shaping pocket adapted to receive a bunch and shape the same therein, of a bunch shaping cover arranged to close said pocket, extensions formed on said cover, and a member provided with resiliently mounted toggle jaws movable into engagement with said extensions to grip said cover for removal from said pocket, said jaws being provided with projections arranged to coact with notches formed on said extensions to center said cover in proper position with respect to said pocket when said cover is moved into closing position with respect to said pocket.

27. Mechanism for removing and replacing covers on mold pockets of a cigar machine wherein each cover is provided with a member having two dovetail extensions, said mechanism comprising a movable arm, a pair of relatively movable cover gripping members carried by said arm, and means for opening said gripping members to release a cover held between them.

28. Mechanism for removing and replacing covers on mold pockets of a cigar machine wherein each cover is provided with a member having two dovetail extensions, said mechanism comprising a movable arm, a pair of relatively movable cover gripping members carried by said arm, and means for opening said gripping members to release a cover held between them, said last-named means including a lever, and means carried by said lever engaging both of said gripping means to force them away from said dovetailed extensions.

29. In a device for removing and replacing mold covers on pockets of a cigar machine, cover holding mechanism comprising a movable arm, relatively movable coacting jaws pivotally mounted on one end of said arm, and a lever coacting with said arm and movable relative thereto for opening said jaws to release a cover held therebetween.

30. A cover removing and replacing device for a cigar machine comprising an arm provided with a bifurcation at one end, spaced pins mounted in said bifurcation, interconnected gripping jaws carried by said pins, springs mounted on said arm and engaging said jaws for normally holding said jaws in cover gripping position, and a lever coacting with said arm and movable relative thereto for opening said jaws to release a cover held therein.

31. A cover removing and replacing device for a cigar machine comprising an arm provided with a bifurcation at one end, spaced pins mounted in said bifurcation, interconnected gripping jaws carried by said pins, springs mounted on said arm and engaging said jaws for normally holding said jaws in cover gripping position, a lever coacting with said arm and movable relative thereto for opening said jaws to release a cover held therein, and projections in said jaws arranged to engage complementary notches on said cover for locating said cover in proper position on said turret.

32. In a cigar shaping mechanism, the combination of a turret provided with a plurality of pockets, completely detachable covers coacting with said pockets for molding bunches in said pockets, means engaging with opposite ends of said covers for holding said covers on their respective pockets, projecting members spaced from the ends of said covers and connected to the top of said mold covers and adapted to be engaged for removal of said mold covers, and mechanism for individually removing and replacing said covers on said pockets by engaging said projecting members.

33. The combination with a group of complementary cover and pocket cigar bunch shaping members, of a rotating turret on which said pockets are mounted; means wholly on the turret for holding each cover on its respective pocket; mechanism for removing individually each cover completely from said pocket and turret and for replacing individually each of said covers on said pocket and turret; and releasing means constructed and arranged to incapacitate said holding means to allow each individual cover to be removed from said pocket and turret by said mechanism.

34. The combination with cigar bunch shaping pockets, of a revolving turret support for said pockets, complementary shaping covers wholly removable from said shaping pockets and revolving support, means engaging with a portion of said covers for holding said covers on said pockets to shape cigar bunches located therein, projections formed on another portion of said covers, additional means engaging with said projections for lifting exclusively by said projections a cover entirely away from one of said pockets and turret support and for later replacing said cover on a pocket carried by said support, and devices imparting movement to said additional means toward and away from said pockets in timed relation with the movement of said support to lift and replace said covers on said pockets.

SIGURD CLAUSEN.